United States Patent Office.

JOSEPH K. MOORE, OF MILLVILLE, NEW JERSEY.

Letters Patent No. 67,335, dated July 30, 1867.

IMPROVED FERTILIZER.

*The Schedule referred to in these Letters Patent and making part of the same.*

TO ALL WHOM IT MAY CONCERN:

Be it known that I, JOSEPH K. MOORE, of Millville, in the county of Cumberland, and in the State of New Jersey, have invented certain new and useful improvements in "Fertilizers;" and do hereby declare that the following is a full, clear, and exact description thereof.

My invention consists in the use of clam or oyster shells with sulphuric or other similar acids, and is made as follows: I take a sufficient quantity of shells and grind them to powder in any known or ordinary process; then I add the acid, which is first mixed in water, the water and acid being of equal proportions; then moisten the powdered shells with the mixture, when the fertilizer is ready for use. For some land only a small quantity of the acid is necessary, and for others none at all. By grinding the shells, instead of burning them, I preserve the ammonia, which is now lost by burning. I also preserve the ingredients most needed as a fertilizer.

Having thus fully described my invention, what I claim is—

1. The powdered clam or oyster shells as a fertilizer, substantially as set forth.

2. The ground shells, when used with the ingredients specified, in the manner substantially as and for the purposes set forth.

In testimony that I claim the foregoing I have hereunto set my hand this 24th day of April, 1867.

J. K. MOORE.

Witnesses:
  J. M. MASON,
  A. N. MARR.